United States Patent
Myers

[11] 3,842,368
[45] Oct. 15, 1974

[54] HYBRID LASER STRUCTURES
[75] Inventor: John D. Myers, Toledo, Ohio
[73] Assignee: Owens-Illinois, Inc., Toledo, Ohio
[22] Filed: June 21, 1973
[21] Appl. No.: 372,350

[52] U.S. Cl. ............................................. 331/94.5
[51] Int. Cl. ............................................ H01s 3/20
[58] Field of Search ................................. 331/94.5

[56] References Cited
UNITED STATES PATENTS
3,487,330  12/1969  Gudmundsen ..................... 331/94.5
3,569,860   3/1971  Booth ............................... 331/94.5

Primary Examiner—William L. Sikes
Attorney, Agent, or Firm—Richard D. Heberling; E. J. Holler

[57] ABSTRACT

Hybrid laser structures are disclosed, the structures being axial gradient lasers that are combinations of a plurality of solid-state lasable plate elements spaced along the optical axis of the laser structure and a cooling liquid that lases at the same wavelength as that of the solid-state plate elements so as to provide a high-gain, high-energy-storing laser. The solid-state plate elements can be made of a glass host material doped with trivalent neodymium, and the cooling liquid whose stimulated emission is also at a wavelength of about 1.06 microns; for example, selenium oxychloride doped with $Nd^{3+}$.

8 Claims, 2 Drawing Figures

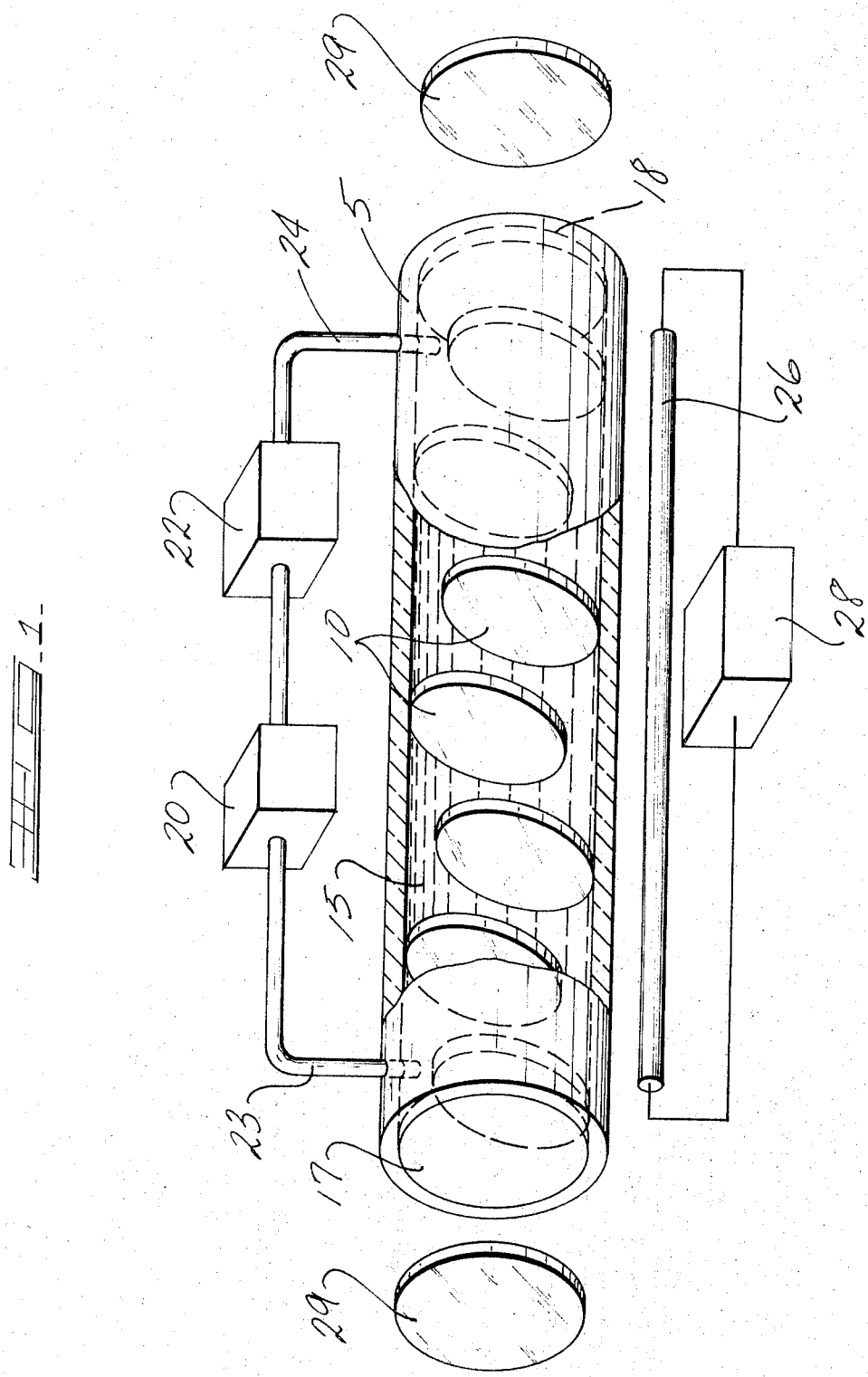

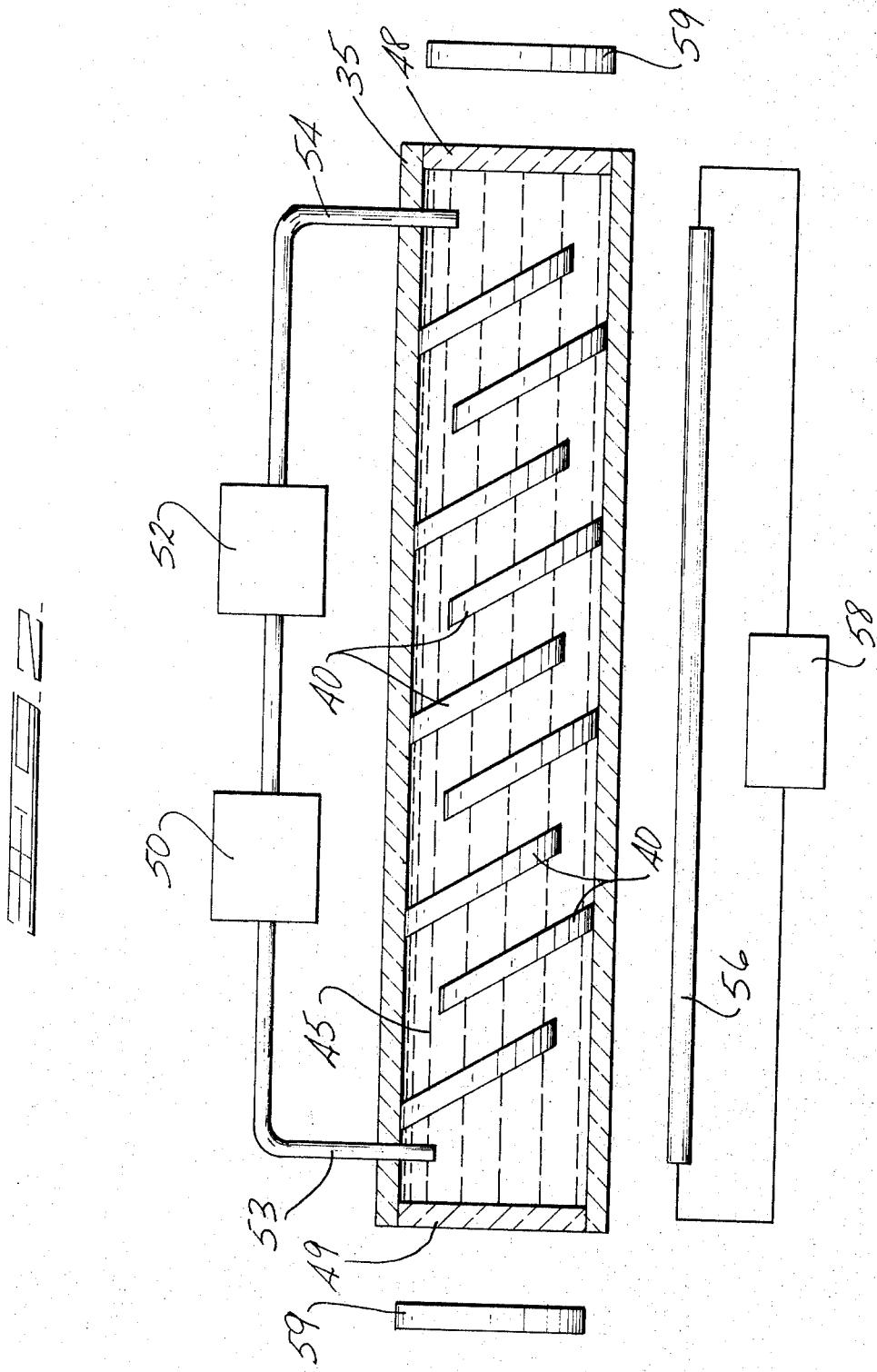

HYBRID LASER STRUCTURES

INVENTION

The present invention relates to hybrid laser structures that include a combination of a plurality of solid-state lasable plate elements spaced in a path along the optical axis of the structure, and a cooling liquid that fills the spaces between the plate elements and also lases at the same wavelength as the solid-state material of the plate elements.

In the past, axial gradient lasers have been made from solid-state laser materials and particularly glass laser materials such as disclosed in the Booth U.S. Pat. No. 3,569,860, and the Gudmundsen U.S. Pat. No. 3,487,330. These axial gradient lasers used employ lasable glass or crystalline discs or plates in a path along the optical axis of the laser structure. One drawback of the axial gradient laser has been the loss introduced by the cooling liquid, which results in low efficiencies.

It is desirable to provide an axial gradient laser that has the low loss approximately that achieved by a solid laser rod, and yet retains the high average power operating capabilities of the axial gradient laser.

It is an object of the present invention to provide a hybrid laser structure that comprises:

A. a plurality of lasable, solid-state plate elements, each spaced from its neighbor and in a path along the optical axis of said laser structure, and including means for maintaining the plate elements in the spaced relationship to each other;

B. a lasable cooling liquid filling spaces between the plate elements, with the optical path, the cooling liquid being capable of stimulated emission in conjunction with the solid-state plate elements.

It is an object of the present invention to provide a hybrid laser structure comprising, in combination:

A. a plurality of lasable glass laser plate elements made from a glass composition that is a host for $Nd^{3+}$; and B. a lasable cooling fluid surrounding each of the plate elements and being a fluid that is capable of stimulated emission in conjunction with the glass plate element.

It is an object of the present invention to provide an improvement in a laser device having a lasable solid-state medium and optical pumping means therefor, the improvement including the lasable medium being a solid-state laser material such as glass doped with $Nd^{3+}$, and the lasable glass medium being surrounded by a lasable liquid in direct surface optical coupling with the solid-state lasable medium.

It is an object of the present invention to provide a hybrid laser structure comprising:

A. a plurality of glass laser discs in an axial gradient laser in which each disc is spaced from its neighbor and located in a path along the optical axis of the laser; and B. a lasable cooling liquid filling the spaces between the discs, each of the glass discs being a lithia-calcia-alumino silicate glass doped with $Nd_2O_3$ and the cooling liquid being selenium oxychloride doped with $Nd^{3+}$.

These and other objects of the present invention will be apparent from the specification that follows, the appended claims, and the drawings, in which:

FIG. 1 is a schematic, partly perspective view of the hybrid laser structure of the present invention, employing a plurality of glass laser discs and a cooling fluid that amplifies the laser output of the glass laser discs; and FIG. 2 is a schematic elevational view of another embodiment of a hybrid laser structure according to the present invention employing solid-state laser plate elements, and lasable cooling fluid surrounding the same that amplifies the laser output of the solid-state plate elements.

The present invention provides an improved axial gradient laser structure that is a hybrid laser comprising, in combination:

A. a plurality of lasable plate elements that are preferably glass laser discs, squares or rectangles, each element spaced from its neighbor and located in the path along the optical axis of the structure, and including means for maintaining the plate elements in their spaced relationship; and B. a lasable cooling fluid, such as selenium oxychloride doped with $Nd^{3+}$ for filling the space between the plate elements to cool the elements and also amplify the laser output of the elements.

As seen in FIG. 1, a hybrid laser structure is shown comprising a housing 5 for a plurality of plate elements 10 which are in the form of glass laser discs and a cooling fluid 15, such as selenium oxychloride doped with $Nd^{3+}$. The housing 5 is provided with end members 17 and 18 and a means for admitting and removing liquid coolant from the housing, including a pump 20, a heat-exchanger 22, an inlet pipe 23 and an outlet pipe 24, which provides a pump-refrigerant system to force liquid coolant through the laser housing to thereby cool the plate elements 10 and also amplify the output of the elements.

As also seen in FIG. 1, there is provided a flash lamp 26 for pumping the laser disc, the particular flash lamp shown being elongated and supplied with operating energy from a power source 28. Also provided is a pair of end mirrors 29, as is well-known in the art.

As previously indicated, the improvement in the axial gradient laser structure is in providing a coolant that also amplifies the laser output, the coolant being capable of stimulated emission in conjunction with the glass laser element material. For example, the liquid laser material that is preferred is selenium oxychloride doped with $Nd^{3+}$ which has a lasing spectra of about 1.056 microns, which will amplify the laser output of a glass laser material such as a lithia-calcia-alumino silicate disc that has a lasing spectra of about 1.06 microns. It is preferred that the lasing fluid has its peak lasing intensity near or about the same wavelength as that of the solid-state element. Generally, some substantial portion of the intensity output of the stimulated emission of the cooling liquid should be within the same band width as the solid-state element, which for silicate glass, is generally about a width of 260 angstroms. Thus, in accordance with the present invention, a high-gain, high-energy-storage glass solid-state laser is provided which includes in its structure a plurality of solid-state laser plate elements supported in spaced relation along the optical axis of the laser and having a coolant in the spaces between the plate elements, the coolant also amplifying the laser output of the solid-state plate element.

In another embodiment, which is shown in FIG. 2, there is provided a housing 35 and a plurality of solid-state plate elements in the form of glass squares or plates 40 supported within the housing, as is well-known in the art of axial gradient laser construction. Also disposed within the housing is a cooling fluid 45 that surrounds each glass square that is a solid-state plate element, and provides a cooling fluid in direct surface optical coupling with the plate element. In a manner similar to that described in FIG. 1, there is provided end members 48 and 49 for the housing. There is also provided a pump-refrigerant system for moving the cooling fluid in and out of the housing, the means for supplying and removing the fluid to the housing including a pump 50, a heat exchanger 52, an inlet pipe 53 and an outlet pipe 54 that connects the housing with the heat exchanger 52.

An elongated flashtube 56 is provided for pumping the glass plate elements 40 and also the lasable fluid 45. As is well-known, a source of power 58 is provided to supply the electrical energy to the flashtube or flash lamp 56.

As described in FIG. 1, a pair of end mirrors 59 is provided, as is well-known in axial gradient laser construction.

The axial gradient laser structure is well-known, and the lasable cooling fluid can be used in a variety of axial gradient laser structures. In general, the lasable cooling fluid, such as selenium oxychloride doped with $Nd^{3+}$, can be used in place of the conventional coolants, such as heavy water or dimethylsulfoxide. Incorporated by reference herein are patents showing suitable axial gradient laser structures for use with the lasable cooling fluid of the present invention, the patents being the Gudmundsen U.S. Pat. No. 3,487,330; Booth U.S. Pat. No. 3,569,860; and Zitkus U.S. Pat. No. 3,711,785.

The preferred cooling fluid, as previously indicated, is selenium oxychloride doped with $Nd^{3+}$. This material is disclosed for use in a U.S. Pat. No. 3,623,995, which is hereby incorporated by reference for its description of the cooling liquid.

Also suitable for use as a lasable cooling liquid is phosphorus oxychloride doped with $Nd^{3+}$. An article entitled "Brillouin and Rayleigh Scattering in Aprotic Laser Solutions Containing Neodymium," Pappalardo, R.; Lempicki, A. (Bayside Res. Cent., GTE Lab. Inc., Bayside, N.Y.). J. Appl. Phys. 1972, 43(4), 1699–708 (Eng.), describes suitable $POCl_3$ lasing solutions, as well as $SeOCl_2$-based solutions, and this article is also incorporated by reference.

The solid-state plate elements suitable for use in the present invention are glass and crystalline materials, such as glass, ruby, garnet and plastics. The lasing ions are preferably neodymium, but they can be other rare earth ions, such as erbium, or they can be trivalent chromium. When the solid-state plate element is a crystalline material doped with trivalent chromium, the coolant should be a lasable fluid doped with trivalent chromium. As previously indicated, the cooling fluid should have lasing ions that provide stimulated emission in conjunction with the stimulated emission from the solid-state plate element.

Other rare earth ions that can be used for the solid-state plate element and for the cooling fluid include $Praseodymium^{+++}$, $Samarium^{++}$, $Samarium^{+++}$, $Europium^{++}$, $Europium^{+++}$, $Terbium^{+++}$, $Erbium^{+++}$ and $Ytterbium^{+++}$.

A Japanese article entitled "A Construction of the High-power Laser Amplifier Using a Glass and Selenium Oxychloride Doped with $Nd^{3+}$", Japanese Journal of Applied Physics, Vol. 8, No. 8, August, 1969, shows the use of a glass laser and a liquid laser in tandem, and this article describes the energy diagram of glass lasers, the absorptions spectrum of silicate glass doped with $Nd_2O_3$, and the amplification of a glass laser rod doped with $Nd_2O_3$ with the use of a separate liquid laser in tandem, the liquid laser being selenium oxychloride doped with $Nd_2O_3$. In the present invention, the selenium oxychloride doped with $Nd_2O_3$ is used as the cooling liquid that also amplifies the output of the glass laser disc of the axial gradient laser. The article on page 1044 shows the normal lasing spectra or silicate glass doped with $Nd^{3+}$ and selenium oxychloride doped with $Nd^{3+}$, the wavelength in microns being plotted against the intensity or transmittance. This article is incorporated by reference, particularly for its disclosure as to the normal lasing spectra of the lasable colorant liquid and the solid-state glass laser material used to make the plate elements.

The present invention provides for a laser device having a lasable medium and optical pumping means therefor, an improvement in which the lasable medium comprises both a lasable solid member and a body of lasable liquid, in direct surface optical coupling with the lasable solid member. Good results have been obtained when the lasable plate element is a plurality of glass laser articles, such as discs made of a lithia-calcia-alumino silicate laser composition as set forth in U.S. Pat. No. 3,471,406 to Lee and Rapp. One specific glass laser composition that is a preferred solid-state laser material, as set forth in the Lee and Rapp patent, has the following ingredients in approximate mole percentages:

| Ingredient | Mole Percent |
| --- | --- |
| $SiO_2$ | 60 |
| $Al_2O_3$ | 2.5 |
| $Li_2O$ | 27.5 |
| CaO | 10 |
| $Nd_2O_3$ | 0.5 |

What is claimed is:
1. A hybrid laser structure, in combination,
A. a plurality of lasable plate elements each spaced from its neighbor and in a path along the optical axis of said laser structure, and including means for maintaining said plate elements in said spaced relation, and
B. a lasable cooling liquid filling the spaces between said plate elements.

2. The invention defined in claim 1 wherein each said plate element is constituted by glass doped with $Nd^{3+}$.

3. In a laser structure having a plurality of laser plate elements supported in spaced relation along the optical axis of said laser structure, and having a liquid coolant in the spaces between said plate elements, the improvement comprising said liquid coolant being a lasable coolant.

4. The invention in claim 3 wherein each said plate element is constituted by a glass host doped with $Nd^{3+}$ and said liquid comprises selenium oxychloride doped with $Nd^{3+}$.

5. In a laser device having a lasable medium and optical pumping means therefor, the improvement comprising:
said lasable medium being constituted by at least a lasable solid member and a body of a lasable liquid medium in direct surface optical coupling with said solid member.

6. The invention defined in claim 5 wherein said solid member is $Nd^{3+}$ doped glass and said liquid medium is $Nd^{3+}$ doped selenium oxychloride.

7. A laser device as defined in claim 5 in which the liquid medium comprises phosphorus oxychloride doped with $Nd^{3+}$.

8. A device as defined in claim 7 in which the solid member is a glass doped with $Nd^{3+}$, the glass having the following approximate composition in mole percentages:

| Ingredient | Mole Percent |
|---|---|
| $SiO_2$ | 60 |
| $Al_2O_3$ | 2.5 |
| $Li_2O$ | 27.5 |
| $CaO$ | 10 |
| $Nd_2O_3$ | 0.5 |

* * * * *